US010525839B2

(12) United States Patent
Chuang et al.

(10) Patent No.: US 10,525,839 B2
(45) Date of Patent: Jan. 7, 2020

(54) BATTERY BOX STRUCTURE OF ELECTRIC VEHICLE

(71) Applicant: KWANG YANG MOTOR CO., LTD., Kaohsiung (TW)

(72) Inventors: Ping-Huan Chuang, Kaohsiung (TW); Yu-Jiun Tsai, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 0 days.

(21) Appl. No.: 16/247,575

(22) Filed: Jan. 15, 2019

(65) Prior Publication Data
US 2019/0270389 A1    Sep. 5, 2019

(30) Foreign Application Priority Data

Mar. 1, 2018  (TW) .............................. 107202744 A (51) Int. Cl.
| | | |
|---|---|---|
| *B60L 50/64* | (2019.01) | |
| *H01M 2/04* | (2006.01) | |
| *B60L 50/60* | (2019.01) | |
| *H01M 2/10* | (2006.01) | |

(52) U.S. Cl.
CPC .............. *B60L 50/64* (2019.02); *B60L 50/66* (2019.02); *H01M 2/0434* (2013.01); *H01M 2/1083* (2013.01)

(58) Field of Classification Search
CPC .... B60K 2001/0455; B60K 2001/0466; B60K 2001/0494; B60L 50/64
USPC ....................................... 180/68.5, 214, 220
See application file for complete search history.

(56) References Cited

U.S. PATENT DOCUMENTS

| | | | | |
|---|---|---|---|---|
| 4,756,978 A | * | 7/1988 | Nitcher ............... | H01M 2/1077 180/68.5 |
| 5,443,926 A | * | 8/1995 | Holland .............. | H01M 10/625 180/68.5 |
| 5,633,095 A | * | 5/1997 | Ishikawa .................... | B62J 1/08 180/68.5 |
| 5,764,025 A | * | 6/1998 | Lehmann ................ | B60R 16/04 320/105 |
| 5,789,898 A | * | 8/1998 | Suzuki ..................... | B62M 6/55 320/104 |
| 5,798,702 A | * | 8/1998 | Okamoto ................. | B62M 6/45 340/636.1 |
| 6,016,882 A | * | 1/2000 | Ishikawa ................ | B62K 19/46 180/207.3 |
| 6,095,270 A | * | 8/2000 | Ishikawa .................. | B62H 5/00 180/220 |

(Continued)

*Primary Examiner* — Jeffrey J Restifo
(74) *Attorney, Agent, or Firm* — Leong C. Lei (57) ABSTRACT

A battery structure of an electric vehicle is provided. The battery includes a main body, a top cap arranged on a top side of the main body, and a bottom lid arranged on a bottom side of the main body. The main body is provided, in an interior thereof, with a battery core. A lift handle is mounted to the top cap. The lift handle is spaced from a top surface of the top cap by a spacing distance. The lift handle has an outside perimeter that, in the entirety, delimits an area that is smaller than an area delimited by an outside perimeter of the top cap. The lift handle has a circumference having at least two sides that are generally in alignment with one side of a circumference of the top cap and the main body. As such, a user lifting the battery is made easy.

12 Claims, 9 Drawing Sheets

(56) References Cited

U.S. PATENT DOCUMENTS

| | | | | |
|---|---|---|---|---|
| 6,148,944 A * | 11/2000 | Adomi | ................... | B62M 6/60 |
| | | | | 180/206.4 |
| 6,285,160 B1 * | 9/2001 | Tsai | ..................... | B60R 16/04 |
| | | | | 180/68.5 |
| 6,415,881 B1 * | 7/2002 | Tsai | ..................... | B62K 3/002 |
| | | | | 16/429 |
| 6,423,443 B1 * | 7/2002 | Tsuboi | ................... | B60K 1/04 |
| | | | | 180/68.5 |
| 7,117,966 B2 * | 10/2006 | Kohda | ................... | B60K 1/04 |
| | | | | 180/68.5 |
| 7,320,843 B2 * | 1/2008 | Harrington | ........... | H01M 2/024 |
| | | | | 429/100 |
| 7,413,045 B2 * | 8/2008 | Tien | ..................... | B60R 16/04 |
| | | | | 180/68.5 |
| 8,220,679 B2 * | 7/2012 | Yoshida | ................ | B60R 16/04 |
| | | | | 224/412 |
| 8,413,947 B2 * | 4/2013 | Chiang | .................. | B62M 6/90 |
| | | | | 248/553 |
| 8,893,837 B2 * | 11/2014 | Kwag | ................. | H01R 33/765 |
| | | | | 180/65.1 |
| 9,399,499 B2 * | 7/2016 | Honda | ................... | B62M 6/90 |
| 9,966,712 B1 * | 5/2018 | Hongpeng | ........... | H01R 13/052 |
| 10,183,591 B2 * | 1/2019 | Shieh | ................... | B62K 19/40 |
| 2013/0216883 A1 * | 8/2013 | Kawatani | ............. | H01M 2/305 |
| | | | | 429/99 |

* cited by examiner

BATTERY BOX STRUCTURE OF ELECTRIC VEHICLE

(a) TECHNICAL FIELD OF THE INVENTION

The present invention generally relates to a battery structure of an electric vehicle, and more particularly to a battery box structure of an electric vehicle that allows a user to easily lift and remove batteries, particularly to lift and remove two batteries with one single hand.

(b) DESCRIPTION OF THE PRIOR ART

The concept of environmental protection through energy saving and carbon reduction is nowadays progressively prevailing. Electrification is a global trend for transportation and is an unstoppable future. Thus, electric vehicles are a new goal of operation of the vehicle industry.

Figure 1:
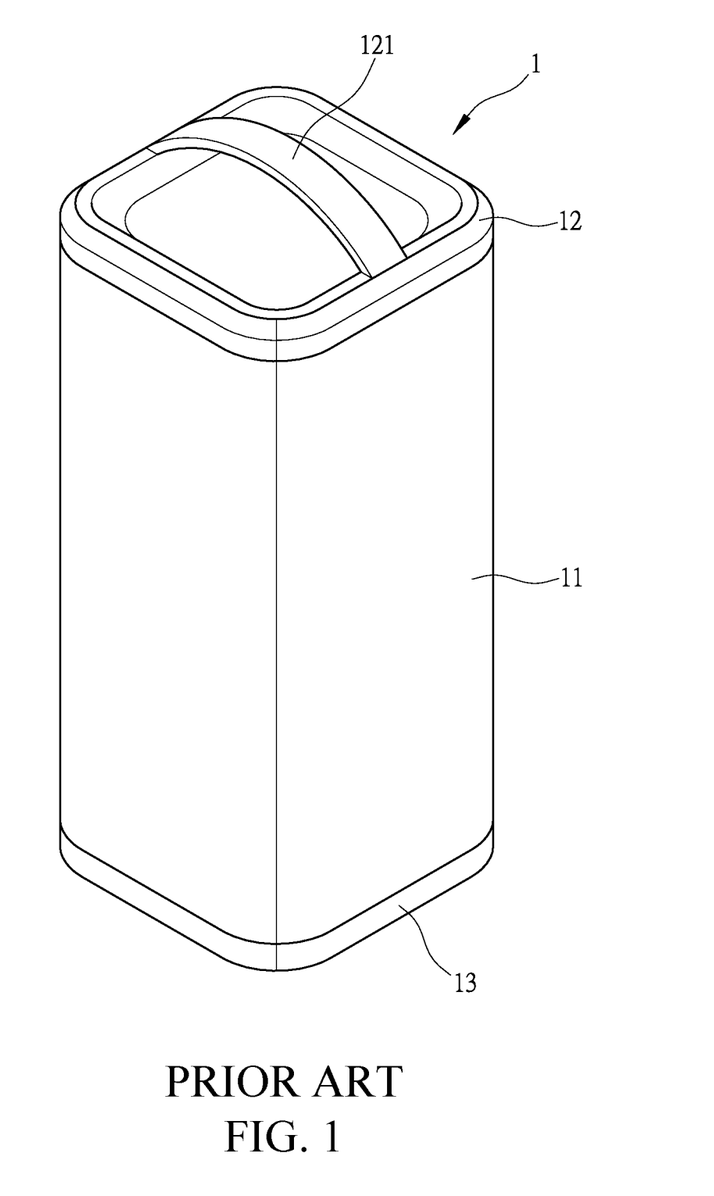
FIG. 1 is a schematic view illustrating a conventional electric vehicle battery.

As shown in FIG. 1, a battery 1 that supplies an electricity source to an electric vehicle comprises a main body 11, a top cap 12 mounted on a top of the main body 11, a bottom lid 13 mounted to a bottom of the main body 11. The main body 11 is provided, in an interior thereof, with a battery core that stores electric energy. A lift handle 12 is provide on a top of the top cap 12, at a location close to a center thereof, and is connected to opposite sides at two ends of the top cap 12. As such, a user's hand is allow to extend through the space under the lift handle 121 to hold and lift the lift handle 121 from the underside thereof, and thus, the battery 1 can be lifted and removed by the lift handle 121 being so held and lifted. In this way, the battery 1 can be easily lifted and removed from an electric vehicle for re-charging or services.

Although having the lift handle 121 mounted to the top cap 12 at a location close to a center thereof as suggested in the known structure provides an effect of easing lifting and removal of the battery 1 by a user, since the lift handle 121 is mounted to a location close to a center of the top cap 12, meaning the lift handle 12 is spaced from a circumference of the main body 11 of the battery 1 by a certain distance, a user is allowed to lift and move one battery 1 each time with one single hand. Speaking more clearly, when two such batteries 1 are placed side by side, the lift handle 121 are spaced from each other by quite a distance so that the user is not capable of holding the two lift handle 121 at the same time with one single hand. Consequently, it is not possible for the user to simultaneously lift and remove two batteries 1 with one hand. On the other hand, to provide a desired capability of cruising, an electric vehicle is often equipped with two or more batteries 1. Apparently, the known structure of the battery 1 causes certain trouble for a user to lift and remove batteries from an electric vehicle.

Thus, it is a challenge of the electric vehicle battery industry to provide a battery structure of an electric vehicle that makes lifting and removal of batteries easy.

SUMMARY OF THE INVENTION

The primary objective of the present invention is to provide a battery structure of an electric vehicle, which helps overcome the drawback of inconvenience of lifting and removing known batteries from an electric vehicle, particularly the drawback of being incapable of lifting and removing two batteries simultaneously with one single hand.

For such a purpose, the primary technical solution of the present invention as proposed in claim 1 is to provide a battery structure of an electric vehicle, the battery comprising a main body, a top cap arranged on a top side of the main body, and a bottom lid arranged on a bottom side of the main body, the main body being provided, in an interior thereof, with a battery core, wherein a lift handle is mounted to the top cap, the lift handle being spaced from a top surface of the top cap by a spacing distance; the lift handle has an outside perimeter that, in the entirety, delimits an area that is smaller than an area delimited by an outside perimeter of the top cap, and the lift handle has a circumference having at least two sides that are generally in alignment with one side of a circumference of the top cap and the main body.

For such a purpose, the primary technical solution of the present invention as proposed in claim 2 is to provide a battery structure of an electrical vehicle, wherein the lift handle comprises a grip in a ring or annular configuration and a pair of connection sections extending from two opposite side portions of the grip toward the top surface of the top cap, the grip being formed with a through opening in a central portion thereof; the grip is connected by the connection sections to the top surface of the top cap and is kept at a distance from the top surface of the top cap.

For such a purpose, the primary technical solution of the present invention as proposed in claim 3 is to provide a battery structure of an electrical vehicle, wherein the distance between the grip and the top surface of the top cap is defined by a length of the connection sections.

For such a purpose, the primary technical solution of the present invention as proposed in claim 4 is to provide a battery structure of an electrical vehicle, wherein the grip comprises a pair of long sides and a pair of short sides, the long sides forming grip bars; the short sides are extended to form the connection sections; the long sides of the grip are generally in alignment with one side of a circumference of the top cap and the main body; when viewed from top side, the short sides of the grip are arranged to each form a stage with respect to the top cap and a projection of the long sides of the grip overlaps a projection of the top cap and the main body.

For such a purpose, the primary technical solution of the present invention as proposed in claim 5 is to provide a battery structure of an electrical vehicle, wherein the top surface of the top cap is provided with a barcode so that an effect of identification is provided to the battery.

For such a purpose, the primary technical solution of the present invention as proposed in claim 6 is to provide a battery structure of an electrical vehicle, wherein the top surface of the top cap is provided with an electric capacity display.

For such a purpose, the primary technical solution of the present invention as proposed in claim 7 is to provide a battery structure of an electrical vehicle, wherein the bottom lid is formed with a mounting hole, the mounting hole being provided for mounting a power input/output device, the power input/output device being electrically connected to the battery core.

For such a purpose, the primary technical solution of the present invention as proposed in claim 8 is to provide a battery structure of an electrical vehicle, wherein an outside surface of the bottom lid, which is a side distant from the main body, is provided with a bottom escutcheon set thereon for covering, the bottom escutcheon being formed with a through hole corresponding to the mounting hole of the bottom lid, the through hole allowing a portion of the power input/output device to extend outside therethrough.

For such a purpose, the primary technical solution of the present invention as proposed in claim 9 is to provide a battery structure of an electrical vehicle, wherein the lift handle is provided with a top escutcheon set thereon for covering.

For such a purpose, the primary technical solution of the present invention as proposed in claim 10 is to provide a battery structure of an electrical vehicle, wherein the electric capacity display comprises a color variable capacity display.

The efficacy that the primary technical solution of the present invention proposed in claim 1 may achieve is that a user lifting a battery is made easy.

The efficacy that the primary technical solution of the present invention proposed in claim 2 may achieve is that a user lifting a battery is made easy.

The efficacy that the primary technical solution of the present invention proposed in claim 3 may achieve is that gripping characteristics of a grip are ensured.

The efficacy that the primary technical solution of the present invention proposed in claim 4 may achieve is that a lift handle and a main body form a collaborative combination with each other to help improve an effect of lifting the lift handle.

The efficacy that the primary technical solution of the present invention proposed in claim 5 may achieve is that an effect of identification is provided to a battery.

The efficacy that the primary technical solution of the present invention proposed in claim 6 may achieve is that a user may readily realize a useable capacity of electricity of a battery.

The efficacy that the primary technical solution of the present invention proposed in claim 7 may achieve is that an effect of charging to and outputting electrical power from a battery can be ensured.

The efficacy that the primary technical solution of the present invention proposed in claim 8 may achieve is that an effect of charging to and outputting electrical power from a battery can be ensured.

The efficacy that the primary technical solution of the present invention proposed in claim 9 may achieve is that an effect of improving an overall product quality of a battery can be achieved.

The efficacy that the primary technical solution of the present invention proposed in claim 10 may achieve in that a user monitoring a useable electricity capacity of a battery is made easy.

DETAILED DESCRIPTION OF THE PREFERRED EMBODIMENTS

Figure 2:
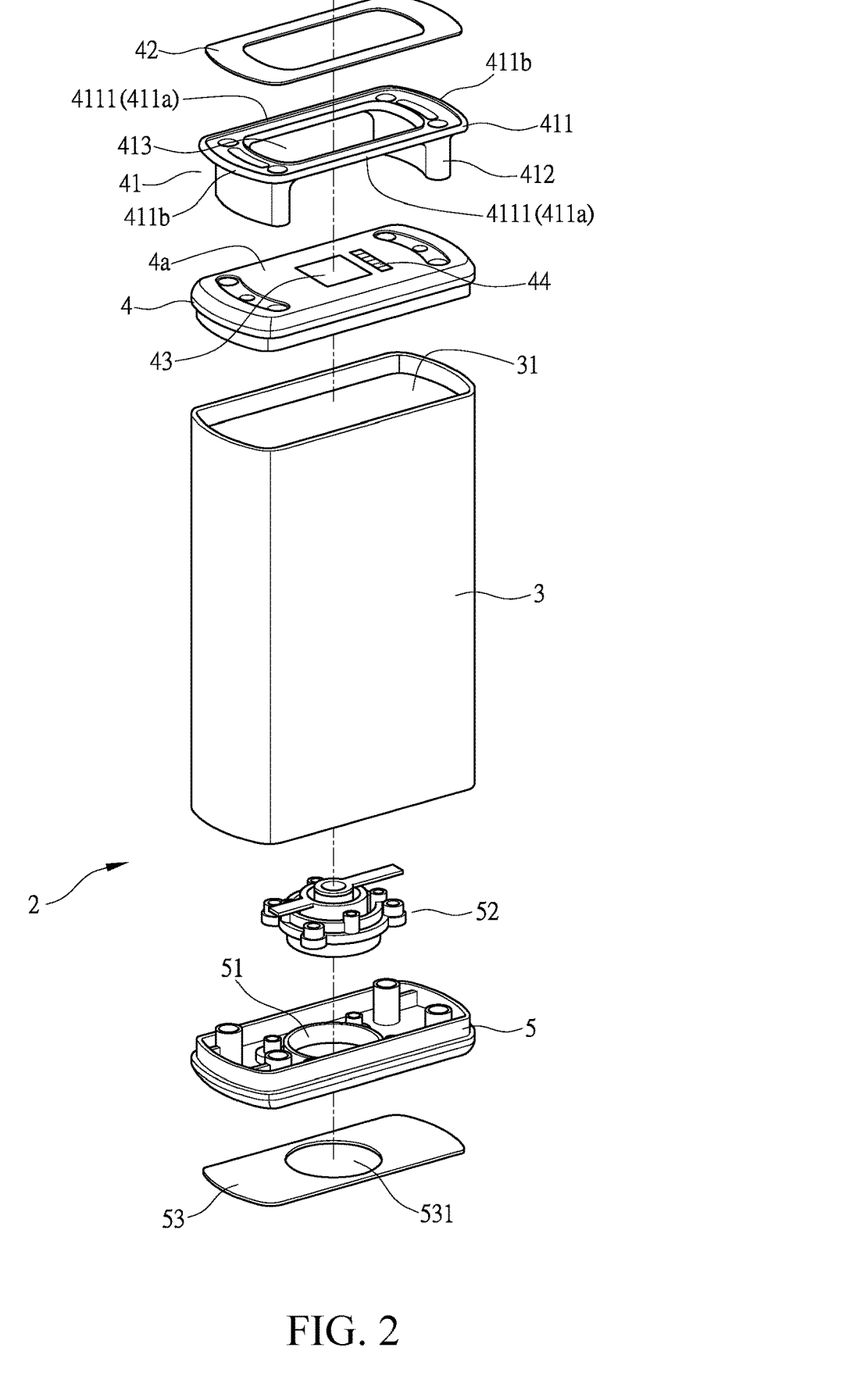
FIG. 2 is an exploded view illustrating the conventional electric vehicle battery.
Figure 3:
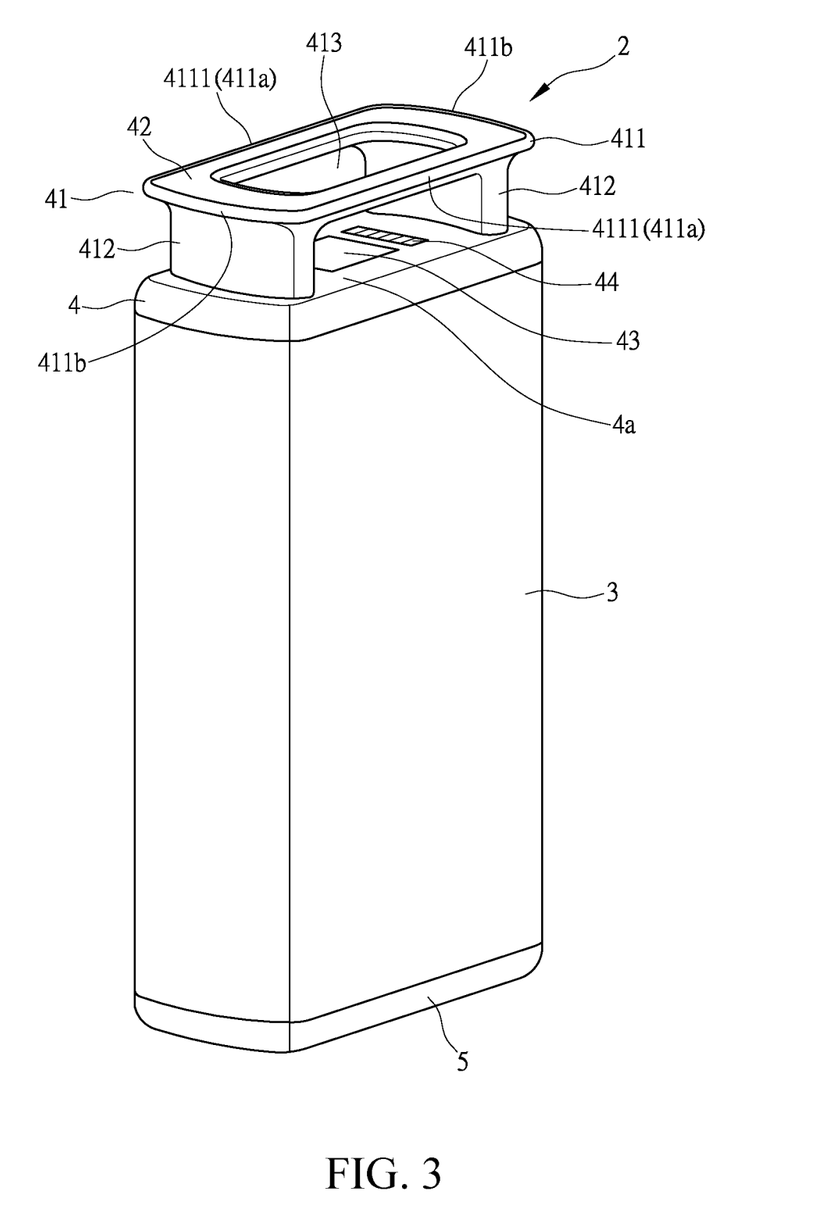
FIG. 3 is a perspective view illustrating an electric vehicle battery according to the present invention.

Firstly, referring to FIGS. 2 and 3, the present invention provides a battery structure of an electric vehicle. The battery 2 comprises a main body 3, a top cap 4 arranged on a top side of the main body 3, and a bottom lid 5 arranged on a bottom side of the main body 3.

As shown in FIGS. 2 and 3, the main body 3 is made in the form of a box having a rectangular configuration. The main body 3 is provided, in an interior thereof, with a battery core 31. The battery core 31 functions to store and accumulate electric energy.

Figure 5:
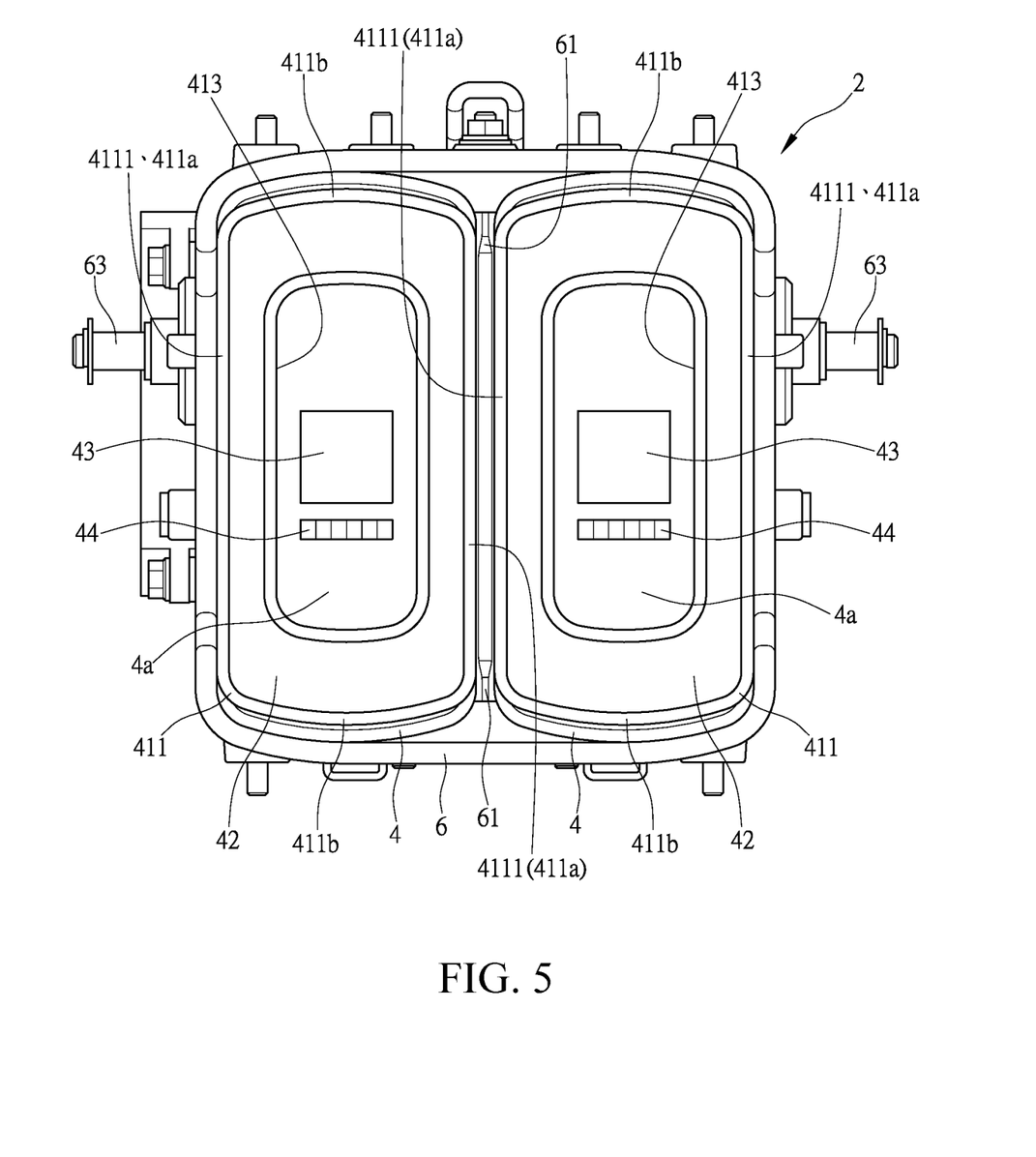
FIG. 5 is a top plan view illustrating the batteries according to the present invention received in the battery receptacle.

As shown in FIGS. 2, 3, and 5, the top cap 4 is mounted to a top end of the main body 3 so as to close and seal the top end of the main body 3. A lift handle 41 is fixed, by means of fastening or welding, to a top of the top cap 4 is fixed. The lift handle 41 comprises a grip 411 in a ring or annular configuration and a pair of connection sections 412 extending from two opposite side portions of the grip 411 toward a top surface 4a of the top cap 4. The grip 411 is formed with a through opening 413 in a central portion thereof. The grip 411 is connected by the connection sections 412 to the top surface 4a of the top cap 4 and is kept at a distance from the top surface 4a of the top cap 4. Specifically, the grip 411 is spaced from the top surface 4a of the top cap 4 by a spacing distance that is defined by a length of the connection sections 412. The grip 411 is structured to provide a rectangular shape that corresponds to the rectangular configuration of the main body 3 and comprises a pair of long sides 411a and a pair of short sides 411b. Specifically, an area delimited by the entire outside perimeter of the lift handle 41 is slightly smaller than an area delimited by an outside perimeter of the top cap 4, and the long sides 411a of the grip 411 are generally flush with or in alignment with a circumferential edge of the top cap 4 and the main body 3 at one side thereof so that as viewed from the top side (shown in FIG. 5), the short sides 411b of the grip 411 are arranged to each form a stage with respect to the top cap 4 and a projection the long sides 411a of the grip 411 overlaps a projection of the top cap 4 and the main body 3. The long sides 411a form grip bars 4111, respectively, for hand gripping and holding, meaning the grip 411 comprises two grip bars 4111 for being gripped and held by a user, while the undersides of the short sides 411b are extended to form the connection sections 412. The lift handle 41 is further provided with a top escutcheon 42 set on and covering a top thereof. The top surface 4a of the top cap 4 is provided with a barcode (such as quick response (QR) code) 43 and an electric capacity display 44. The barcode 43 provides an effect of identification of the battery 2, and the electric capacity display 44 is electrically connected to the battery core 31, in order to display a usable capacity of electricity of the battery core 31 to allow a vehicle operator to realize the remaining capacity of electricity of the battery 2. The electric capacity display 44 as used in this invention is embodied as a color variable capacity display.

As shown in FIGS. 2 and 3, the bottom lid 5 is set on and mounted to a bottom end of the main body 3 so as to close and seal the bottom end of the main body 3. The bottom lid 5 is formed with a mounting hole 51 around a center thereof. The mounting hole 51 is provided for mounting a power input/output device 52. The power input/output device 52 is electrically connected to the battery core 31, so that external electrical power is supplied through the power input/output device 52 into the battery core 31 for accumulation and storage, and also, the electrical power accumulated and stored in the battery core 31 can be output through the device for use by an electric vehicle A. The bottom lid 5 is provided, on an outer side surface thereof, namely the side that is distant from the main body 3, with a bottom escutcheon 53 set thereon for covering. The bottom escutcheon 53 is formed with a through hole 531 corresponding to the mounting hole 51 of the bottom lid 5. The through hole 531 may allow a portion of the power input/output device 52 to extend to the outside therethrough.

Figure 4:
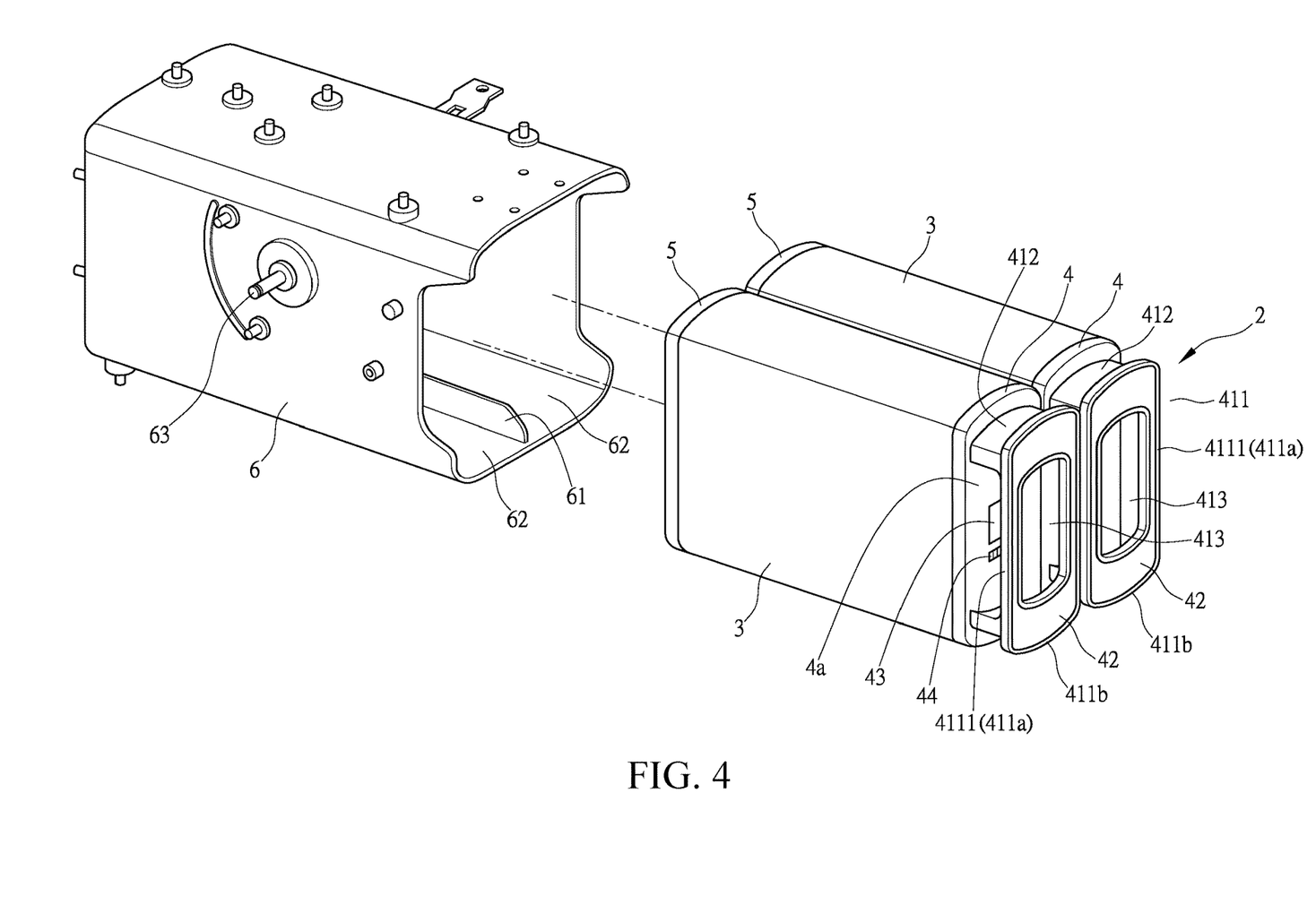
FIG. 4 is an exploded view illustrating batteries and a battery receptacle according to the present invention.
Figure 6:
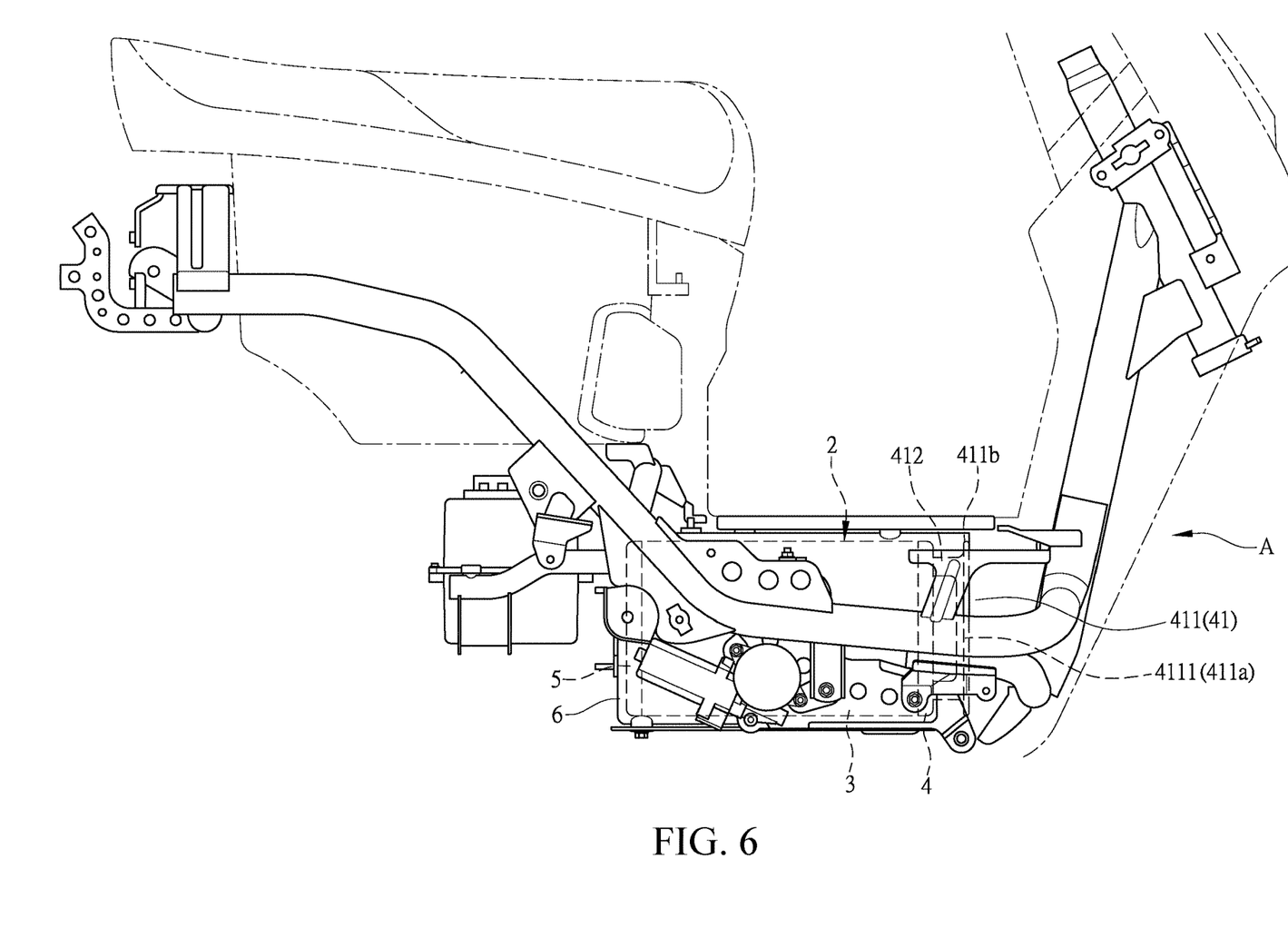
FIG. 6 is a schematic view illustrating the batteries and the battery receptacle according to the present invention being shaft-supported on an electric vehicle.

As shown in FIGS. 4, 5, and 6, the battery 2 is received and retained in a battery receptacle 6. More specifically, two such batteries 2 are received, in a manner of being arranged side by side, into and retained in the battery receptacle 6. The battery receptacle 6 is provided therein with a pair of division ribs 61 that are respectively arranged on a top side and a bottom side of the receptacle to be opposite to each other. The battery receptacle 6 is formed, internally, with two battery compartments 62 as being divided and defined by the division ribs 61. Each of the battery compartments 62 receives one of the batteries 2 therein. The battery receptacle 6 has an external wall that is provided, on two opposite sides thereof, with support shafts 63, such that the battery receptacle 6 are shaft-supported by the support shafts 63 on the electric vehicle A and thus, the batteries 2 cab be securely stored in the electric vehicle A.

Figure 7:
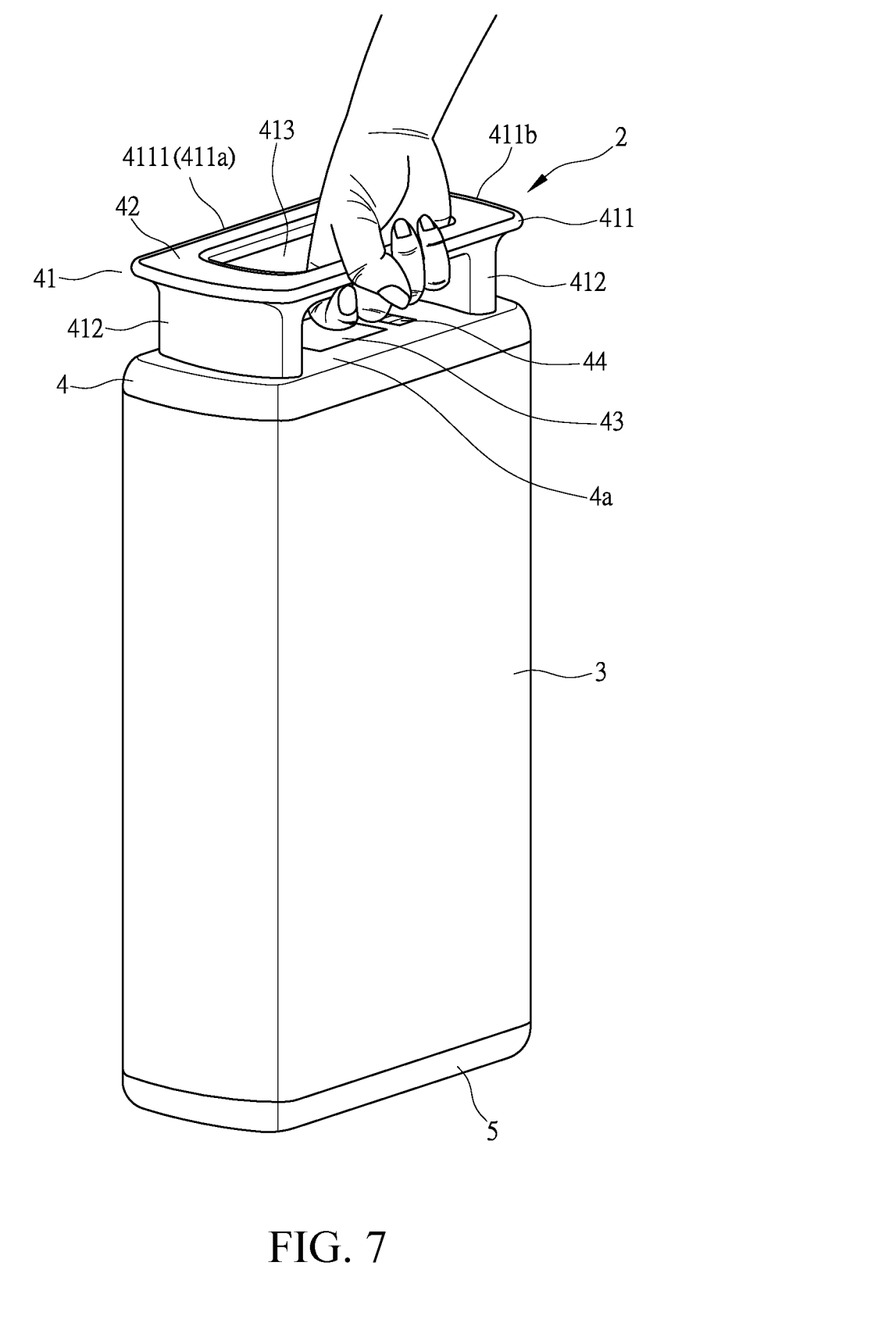
FIG. 7 is a schematic view illustrating lifting a battery according to the present invention with one single hand.
Figure 8:
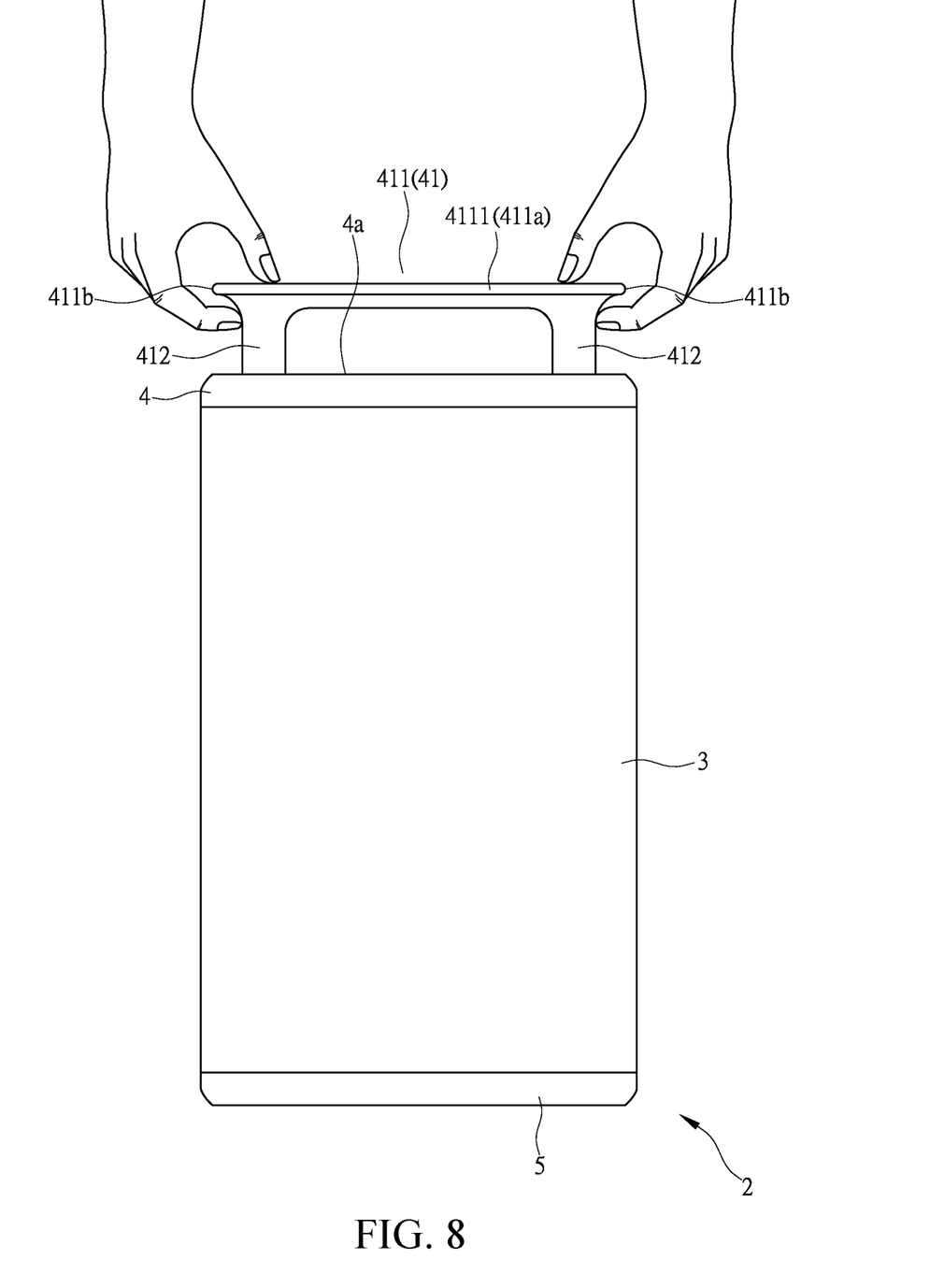
FIG. 8 is a schematic view illustrating lifting a battery according to the present invention with two hands.
Figure 9:
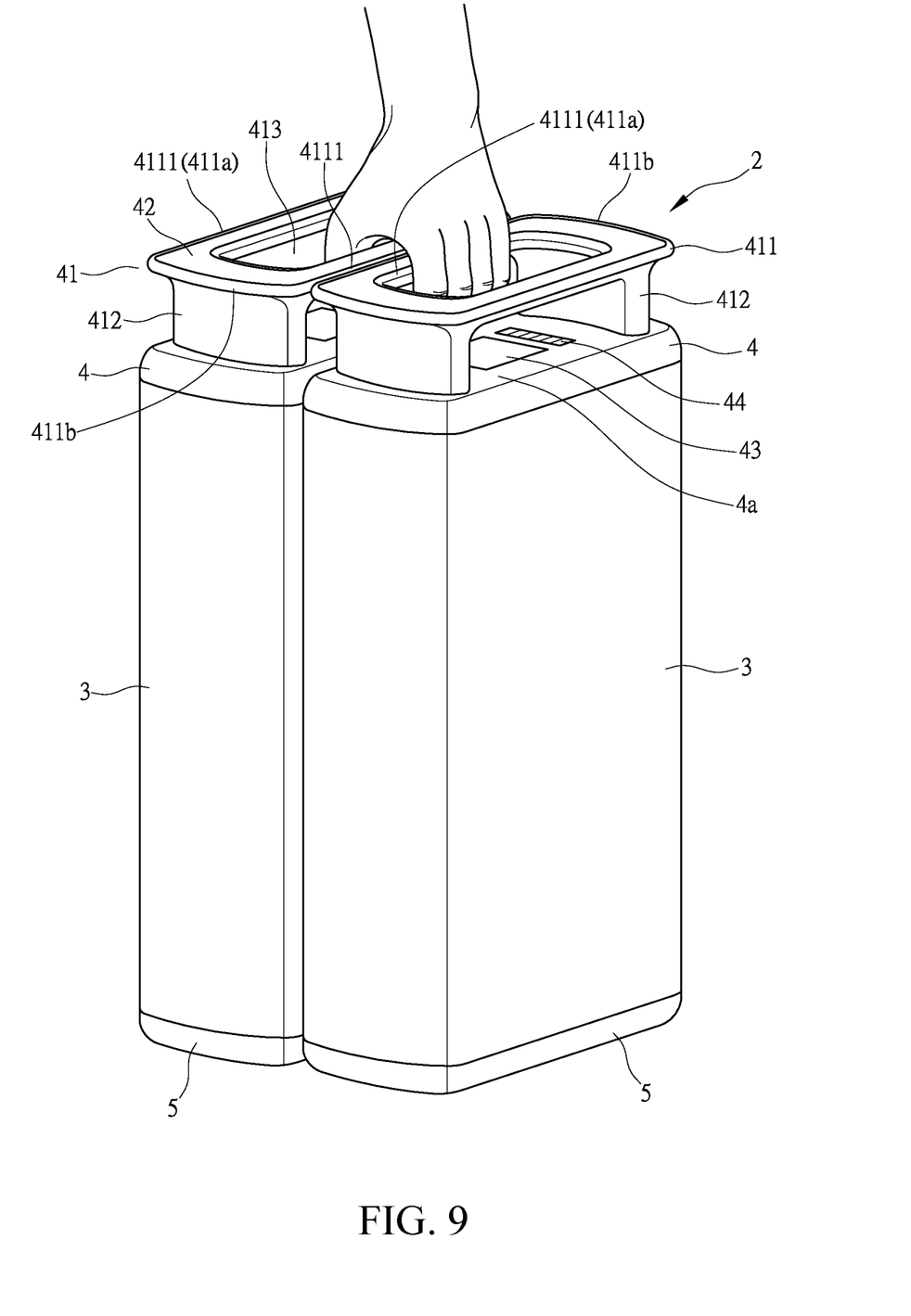
FIG. 9 is a schematic view illustrating lifting two batteries according to the present invention with one single hand.

As shown in FIGS. 7, 8, and 9, when a user attempts to lift and move a battery 2 to be disposed into the battery receptacle 6 or to lift and remove a battery 2 from the battery receptacle 6, the user may grip and hold the grip bars 4111 of the lift handle 41 of the top cap 4 with one single hand to lift the battery 2, or may grip and hold two opposite sides of the lift handle 41 of the top cap 4 with two hands to lift the battery 2. It is also certain that due to the area delimited by the entire outside perimeter of the lift handle 41 being smaller than the area delimited by the outside perimeter of the top cap 4 and the long sides 411a of the grip 411 being generally in alignment with opposite sides of the outer circumference of the top cap 4 and the main body 3, two such batteries 2 may be arranged closely side by side so that the grip bars 4111 of the two batteries 2 are also positioned closely side by side to allow the user to simultaneously hold the grip bars 4111 of the two batteries 2 with one single hand to thereby readily lift two such batteries 2 simultaneously, whereby an operation of lifting the batteries 2 by the user is simplified.

The primary efficacy of the present invention is that a battery 2 comprises a main body 3, a top cap 4 arranged at a top side of the main body 3, and a bottom lid 5 arranged at a bottom side of the main body 3, the main body 3 being provided therein with a battery core 31, the top cap 4 being provided thereon with a lift handle 41, the lift handle 41 being spaced from a top surface 4a of the top cap 4 by a certain distance; the lift handle 41 has an outside perimeter that, in the entirety thereof, delimits an area that is smaller than an area delimited by an outside perimeter of the top cap 4 and at least two sides of a circumference of the lift handle 41 are arranged to each align with one side of a circumference of the top cap 4 and the main body 3 so that a user lifting the battery 2 is made easy.

The second efficacy of the present invention is that a lift handle 41 comprises a grip 411 in a ring or annular configuration and a pair of connection sections 412 extending from two opposite side portions of the grip 411 toward a top surface 4a of a top cap 4, the grip 411 being formed with a through opening 413 in a central portion thereof; the grip 411 is connected by the connection sections 412 to the top surface 4a of the top cap 4 and is kept at a distance from the top surface 4a of the top cap 4 so that a user lifting the battery 2 is made easy.

The third efficacy of the present invention is that a spacing distance between a grip 411 and a top surface 4a of a top cap 4 is defined by a length of connection sections 412 so that gripping characteristics of the grip 411 are ensured.

The fourth efficacy of the present invention is that a grip 411 comprises a pair of long sides 411a and a pair short sides 411b, the long sides 411a forming grip bars 4111; the short sides 411b are extended to form connection sections 412; the long sides 411a of the grip 411 are generally flush with or in alignment with a circumferential edge of a top cap 4 and a main body 3 at one side thereof so that as viewed from the top side, the short sides 411b of the grip 411 are arranged to each form a stage with respect to the top cap 4 and a projection the long sides 411a of the grip 411 overlaps a projection of the top cap 4 and the main body 3 so that the lift handle 41 and the main body 3 form a collaborative combination with each other to help improve an effect of lifting the lift handle 41.

The fifth efficacy of the present invention is that a top surface 4a of a top cap 4 is provided with a barcode 43 so that an effect of identification is provided to the battery 2.

The sixth efficacy of the present invention is that a top surface 4a of a top cap 4 is provided with an electric capacity display 44 so that a user may readily realize a useable capacity of electricity of a battery 2.

The seventh efficacy of the present invention is that a bottom lid 5 is formed with a mounting hole 51, the mounting hole 51 being provided for mounting a power input/output device 52, the power input/output device 52 being electrically connected to a battery core 31 so that an effect of charging to and outputting electrical power from the battery 2 can be ensured.

The eighth efficacy of the present invention is that an outside surface of a bottom lid 5, namely a side distant from the main body 3, is provided with a bottom escutcheon 53 set thereon for covering, the bottom escutcheon 53 being formed with a through hole 531 corresponding to a mounting hole 51 of the bottom lid 5, the through hole 531 allowing a portion of a power input/output device 52 to extend outside therethrough, so that an effect of charging to and outputting electrical power from the battery 2 can be ensured.

The ninth efficacy of the present invention is that a lift handle 41 is provided thereon with a top escutcheon 42 for covering so that an effect of improving an overall product quality of a battery 2 can be achieved.

The tenth efficacy of the present invention is that an electric capacity display 44 is made as a color variable capability display so that a user monitoring a useable electricity capacity of a battery 2 is made easy.

We claim:

1. A battery structure of an electric vehicle, the battery comprising a main body, a top cap arranged on a top side of the main body, and a bottom lid arranged on a bottom side of the main body, the main body being provided, in an interior thereof, with a battery core, wherein a lift handle is mounted to the top cap, the lift handle being spaced from a top surface of the top cap by a spacing distance; the lift handle has an outside perimeter that, in the entirety, delimits an area that is smaller than an area delimited by an outside perimeter of the top cap, and the lift handle has a circumference having at least two sides that are generally in alignment with one side of a circumference of the top cap and the main body; wherein the lift handle comprises a grip in a ring or annular configuration and a pair of connection sections extending from two opposite side portions of the grip toward the top surface of the top cap, the grip being formed with a through opening in a central portion thereof; the grip is connected by the connection sections to the top surface of the top cap and is kept at a distance from the top surface of the top cap; wherein the grip comprises a pair of long sides and a pair of short sides, the long sides forming grip bars; the short sides are extended to form the connection sections; the long sides of the grip are generally in alignment with one side of a circumference of the top cap and the main body; when viewed from top side, the short sides of the grip are arranged to each form a stage with respect to the top cap and a projection of the long sides of the grip overlaps a projection of the top cap and the main body.

2. The battery structure of the electric vehicle according to claim 1, wherein the top surface of the top cap is provided with a barcode.

3. The battery structure of the electric vehicle according to claim 1, wherein the top surface of the top cap is provided with an electric capacity display.

4. The battery structure of the electric vehicle according to claim 3, wherein the electric capacity display comprises a color variable capacity display.

5. The battery structure of the electric vehicle according to claim 1, wherein the bottom lid is formed with a mounting hole, the mounting hole being provided for mounting a power input/output device, the power input/output device being electrically connected to the battery core.

6. The battery structure of the electric vehicle according to claim 5, wherein an outside surface of the bottom lid, which is a side distant from the main body, is provided with a bottom escutcheon set thereon for covering, the bottom escutcheon being formed with a through hole corresponding to the mounting hole of the bottom lid, the through hole allowing a portion of the power input/output device to extend outside therethrough.

7. The battery structure of the electric vehicle according to claim 1, wherein the lift handle is provided with a top escutcheon set thereon for covering.

8. The battery structure of the electric vehicle according to claim 1, wherein the top surface of the top cap is provided with a barcode.

9. The battery structure of the electric vehicle according to claim 1, wherein the top surface of the top cap is provided with an electric capacity display.

10. The battery structure of the electric vehicle according to claim 9, wherein the electric capacity display comprises a color variable capacity display.

11. The battery structure of the electric vehicle according to claim 1, wherein the lift handle is provided with a top escutcheon set thereon for covering.

12. A battery structure of an electric vehicle, the battery comprising a main body, a top cap arranged on a top side of the main body, and a bottom lid arranged on a bottom side of the main body, the main body being provided, in an interior thereof, with a battery core, wherein a lift handle is mounted to the top cap, the lift handle being spaced from a top surface of the top cap by a spacing distance; the lift handle has an outside perimeter that, in the entirety, delimits an area that is smaller than an area delimited by an outside perimeter of the top cap, and the lift handle has a circumference having at least two sides that are generally in alignment with one side of a circumference of the top cap and the main body; wherein the lift handle comprises a grip in a ring or annular configuration and a pair of connection sections extending from two opposite side portions of the grip toward the top surface of the top cap, the grip being formed with a through opening in a central portion thereof; the grip is connected by the connection sections to the top surface of the top cap and is kept at a distance from the top surface of the top cap; wherein the distance between the grip and the top surface of the top cap is defined by a length of the connection sections; wherein the grip comprises a pair of long sides and a pair of short sides, the long sides forming grip bars; the short sides are extended to form the connection sections; the long sides of the grip are generally in alignment with one side of a circumference of the top cap and the main body; when viewed from top side, the short sides of the grip are arranged to each form a stage with respect to the top cap and a projection of the long sides of the grip overlaps a projection of the top cap and the main body.

* * * * *